(12) United States Patent  
Hikichi

(10) Patent No.: US 8,977,872 B2  
(45) Date of Patent: Mar. 10, 2015

(54) INFORMATION PROCESSING APPARATUS HAVING POWER SAVING MODE, AND CONTROL METHOD AND STORAGE MEDIUM THEREFOR

(75) Inventor: Atsushi Hikichi, Yokohama (JP)

(73) Assignee: Canon Kabushiki Kaisha (JP)

( * ) Notice: Subject to any disclaimer, the term of this patent is extended or adjusted under 35 U.S.C. 154(b) by 215 days.

(21) Appl. No.: 12/832,644

(22) Filed: Jul. 8, 2010

(65) Prior Publication Data

US 2011/0010570 A1    Jan. 13, 2011

(30) Foreign Application Priority Data

Jul. 9, 2009    (JP) ................................ 2009-162690

(51) Int. Cl.
```
G06F 1/00      (2006.01)
H04N 1/00      (2006.01)
G06F 3/12      (2006.01)
```
(52) U.S. Cl.
CPC .......... *H04N 1/00885* (2013.01); *G06F 3/1221* (2013.01); *G06F 3/1229* (2013.01); *G06F 3/1259* (2013.01); *H04N 1/00891* (2013.01); *H04N 1/00896* (2013.01); *H04N 2201/0094* (2013.01); *Y02B 60/1271* (2013.01)
USPC ............ 713/320; 713/322; 713/323; 713/100

(58) Field of Classification Search
CPC ........................................................ G06F 1/32
USPC .......................... 713/320, 323, 324, 322, 100
See application file for complete search history.

(56) References Cited

U.S. PATENT DOCUMENTS

| | | | | |
|---|---|---|---|---|
| 5,402,527 | A * | 3/1995 | Bigby et al. | 358/1.1 |
| 7,334,146 | B2 * | 2/2008 | Kobayashi et al. | 713/324 |
| 7,555,662 | B2 * | 6/2009 | Kidoguchi | 713/323 |
| 8,145,931 | B2 * | 3/2012 | Vojak et al. | 713/323 |
| 2001/0021982 | A1 * | 9/2001 | Shimoda | 713/320 |
| 2007/0009154 | A1 * | 1/2007 | Iwabayashi et al. | 382/176 |
| 2007/0223028 | A1 * | 9/2007 | Boyes et al. | 358/1.14 |

FOREIGN PATENT DOCUMENTS

JP       07-251550 A    10/1995

* cited by examiner

*Primary Examiner* — Jaweed A Abbaszadeh  
*Assistant Examiner* — Austin Hicks  
(74) *Attorney, Agent, or Firm* — Rossi, Kimms & McDowell LLP

(57) ABSTRACT

An information processing apparatus in which a first waiting time is set, if a job interval is longer than a reference time and a predetermined condition is not satisfied, and a second waiting time longer than the first waiting time is set, if a job interval is longer than the reference time and the predetermined condition is satisfied. In a case that the job interval is longer than the first reference time, a control unit causes a multi-function peripheral to shift from a normal mode to a power saving mode when the first waiting time has elapsed after a job having been processed, if the predetermined condition is not satisfied, and causes the multi-function peripheral to shift to the power saving mode when the second waiting time has elapsed after the job having been processed, if the predetermined condition is satisfied.

25 Claims, 10 Drawing Sheets

INFORMATION PROCESSING APPARATUS HAVING POWER SAVING MODE, AND CONTROL METHOD AND STORAGE MEDIUM THEREFOR

BACKGROUND OF THE INVENTION

1. Field of the Invention

The present invention relates to an information processing apparatus having a power saving mode, a control method therefore, and a storage medium storing a program for executing the control method.

2. Description of the Related Art

To reduce power consumption of an information processing apparatus operable either in a normal mode or in a power saving mode, a shift to the normal mode is made, e.g., in response to a job being input, and a shift to the power saving mode is made, e.g., in response to the job having been processed.

However, a shift from the power saving mode to the normal mode requires large electric power and takes a long time. Therefore, with the information processing apparatus designed to always enter the power saving mode in response to a job having been processed, power consumption cannot effectively be reduced and the information processing apparatus does not promptly become operable as needed.

To eliminate these problems, an image forming apparatus disclosed in Japanese Laid-open Patent Publication No. 07-251550 is configured to measure a job interval (i.e., a time period from when a preceding job is executed to when a current job is executed), set a waiting time, after which the power saving mode is entered, based on the measured job interval when the current job is completed, and cause the information processing apparatus to enter the power saving mode when the set waiting time has elapsed after completion of the job. Specifically, if the job interval is long, it is determined that the frequency of use of the information processing apparatus is low and therefore the waiting time after which the information processing apparatus enters the power saving mode is set to be short. On the other hand, if the job interval is short, it is determined that the frequency of use of the information processing apparatus is high and the waiting time is set to be long.

However, even if the job interval is long, the frequency of use of the information processing apparatus is not always low. It is sometimes preferable that the waiting time after which the information processing apparatus enters the power saving mode is set to be long when any of the following conditions is met, even if the job interval is long. For example, in a case that a job input instruction, e.g., for copying, is given by a user by operating an operation unit of the information processing apparatus, and in a case that an instruction to input a job of a type which is high in occurrence frequency is given by a user via the operation unit, there is a high possibility that the next job is input immediately thereafter. In another case that an input job is a form print job or other job for continuously inputting data, there is a high possibility that data are successively input thereafter. In still another case that no job has been input for a long period of time such as at the first thing in the morning or at the first day after long holidays, there is a high possibility that a job is input immediately after the power is turned on. In still another case that a print job is input via the network and a job average execution time is equal to or longer than a predetermined time as in, e.g., the printing of a large number of pages, the next job is input after inspection of printing result and therefore there is a high possibility that the next job is input immediately.

On the other hand, even if the job interval is short, it is not inevitably necessary for the information processing apparatus to be in a standby state for a predetermined time period before being shifted to the power saving mode. More specifically, even if the job interval is short, it is sometimes preferable that a time period after which the information processing apparatus is shifted to the power saving mode is set to be short when any of the following predetermined conditions is met. For example, in a case where a setting is made not to use the printer (e.g., a setting is made to perform a degeneracy operation in which the printer is not used when the printer is in an abnormal state, or a setting is made such that a FAX transmission result report or FAX reception data is not printed, but stored in a memory or in an HDD), an immediate shift to the power saving mode can be allowed since a job can be executed immediately after restoration from the power saving mode. In another case that a frequently used host is not in operation and hosts which are less in number than a predetermined number are in operation, an immediate shift to the power saving mode can be allowed since it can be determined that the power supply to the information processing apparatus will soon be turned off.

SUMMARY OF THE INVENTION

The present invention provides an information processing apparatus in which a first waiting time is set in a case where a job interval is longer than a reference time and a predetermined condition is not satisfied, and a second waiting time longer than the first waiting time is set in a case where the job interval is longer than the reference time and the predetermined condition is satisfied, and provides a control method for the information processing apparatus and a storage medium storing a program for executing the control method.

According to a first aspect of this invention, there is provided an information processing apparatus operable in either a normal mode or in a power saving mode in which power consumption is lower than that in the normal mode, which comprises an input unit configured to input a job, a processing unit configured to process the job input by the input unit, a measurement unit configured to measure a job interval between a first job and a second job input subsequently to the first job, and a control unit configured to shift the information processing apparatus from the normal mode to the power saving mode when a first waiting time has elapsed after the second job has been processed by the processing unit in a case where the job interval measured by the measurement unit is longer than a first reference time and a predetermined condition is not satisfied, and configured to shift the information processing apparatus from the normal mode to the power saving mode when a second waiting time longer than the first waiting time has elapsed after the second job has been processed by the processing unit in a case where the job interval is longer than the first reference time and the predetermined condition is satisfied.

According to a second aspect of this invention, there is provided a control method for an information processing apparatus operable in either a normal mode or in a power saving mode in which power consumption is lower than that in the normal mode, which comprises an input step of inputting a job, a processing step of processing the job input in the input step, a measurement step of measuring a job interval between a first job and a second job input subsequently to the first job, and a control step of shifting the information processing apparatus from the normal mode to the power saving mode when a first waiting time has elapsed after the second job has been processed in the processing step in a case where the job interval measured in said measurement step is longer than a first reference time and a predetermined condition is not satisfied, and of shifting the information processing apparatus from the normal mode to the power saving mode when a second waiting time longer than the first waiting time has elapsed after the second job has been processed in the processing step in a case where the job interval is longer than the first reference time and the predetermined condition is satisfied.

According to a third aspect of this invention, there is provided a storage medium storing a program for executing the control method according to the second aspect of this invention.

With the present invention, the first waiting time can be set in a case where the job interval is longer than the reference time and the predetermined condition is not satisfied, and the second waiting time longer than the first waiting time can be set in a case where the job interval is longer than the reference time and the predetermined condition is satisfied.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

(First Embodiment)

Figure 1:
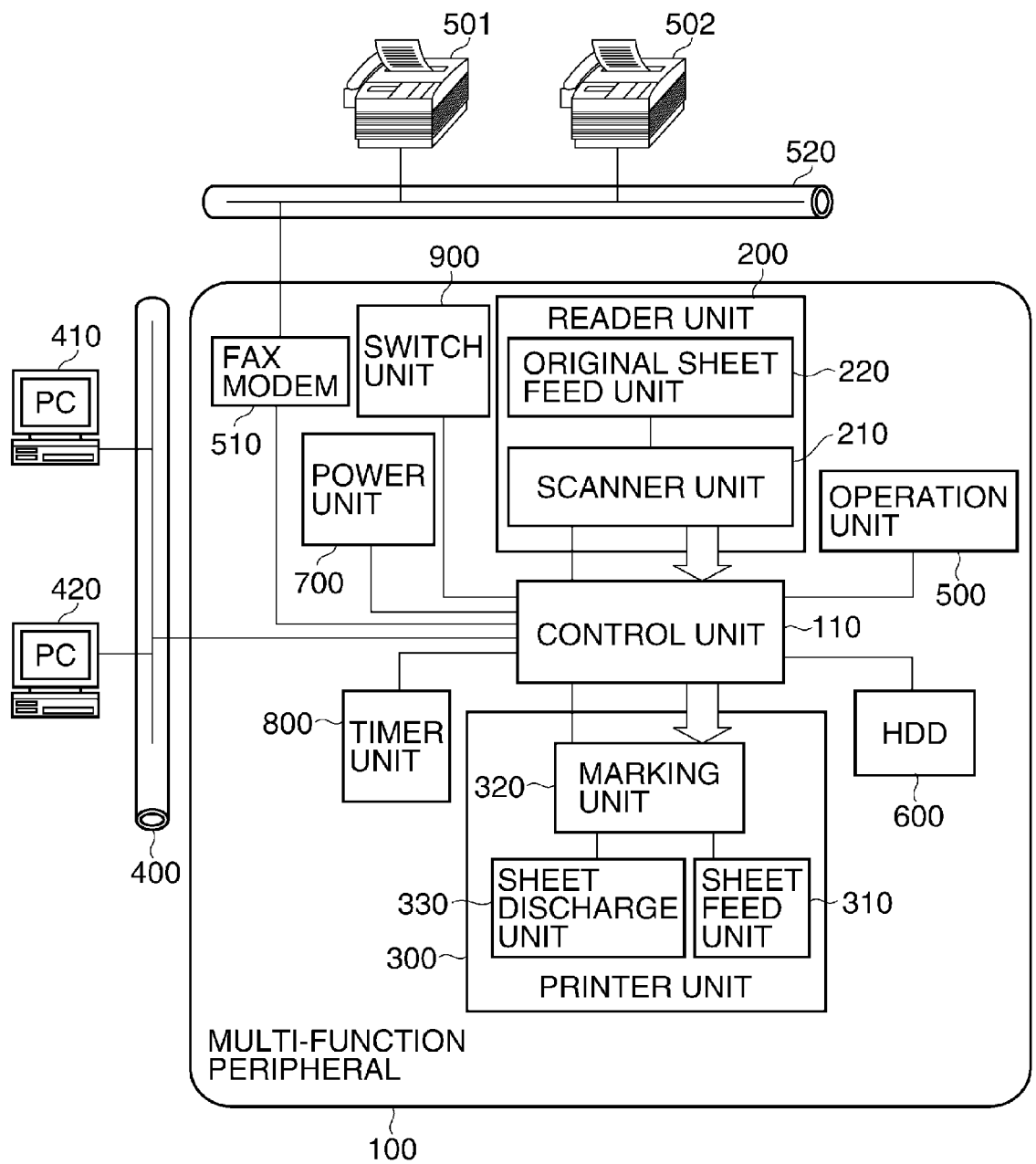
FIG. 1 is a block diagram showing the construction of a multi-function peripheral according to a first embodiment of this invention.

FIG. 1 shows in block diagram the construction of a multi-function peripheral according to a first embodiment.

The multi-function peripheral 100 is an information processing apparatus having a reader unit 200 and a printer unit 300. The multi-function peripheral 100 is connected to a plurality of host computers (PCs) 410, 420 via a network 400 such as a LAN and connected to a plurality of facsimile machines (FAXs) 501, 502 via a telephone line 520.

A control unit 110 is electrically connected to and controls the reader unit 200, the printer unit 300, an operation unit 500, a FAX modem 510, an HDD (hard disk drive) 600, a power unit 700, a timer unit 800, and a switch unit 900. The control unit 110 is connected via the network 400 to the PCs 410, 420 and connected via the FAX modem 510 to the FAXs 501, 502 on the telephone line 520.

The reader unit 200 is comprised of a scanner unit 210 having an original reading function and an original sheet feed unit (feeder) 220 for conveying an original to the scanner unit 210. With this construction, an image of an original conveyed from the feeder 220 can be optically read and converted into image data.

The printer unit 300 includes a sheet feed unit 310, a marking unit 320, and a sheet discharge unit 330. The sheet feed unit 310 has recording sheet cassettes in which plural types of recording sheets are stored, and feeds a predetermined recording sheet from one of the recording sheet cassettes to the marking unit 320. The marking unit 320 transfers and fixes image data onto the recording sheet fed from the sheet feed unit 310. The sheet discharge unit 330 sorts and/or staples recording sheets to which images have been transferred, and discharges the sheets to the outside of the apparatus.

The control unit 110 controls the reader unit 200 to cause it to read image data from an original and controls the printer unit 300 to cause it to transfer the image data onto a recording sheet, whereby a copy function can be offered to a user. The control unit 110 is able to offer a scanner function for converting image data read by the reader unit 200 into code data and transmitting the code data to, e.g., the PC 410 via the network 400. The control unit 110 is able to offer a printer function for converting code data received by a communication unit from, e.g., the PC 410 via the network 400 into image data and outputting the image data by the printer unit 300. The control unit 110 is also able to offer a document storage function for storing transmission/reception image data in the HDD 600. The control unit 110 is able to offer a function for transmitting and receiving image data to and from the FAXs 501, 502 via the FAX modem 510 and the telephone line 520.

Further, the control unit 110 controls the power unit 700 to control power supply to the control unit 110 and various units, which include the reader unit 200, the printer unit 300, the operation unit 500, the FAX modem 510, and the HDD 600. The control unit 110 grasps a state of the switch unit 900.

Figure 2:
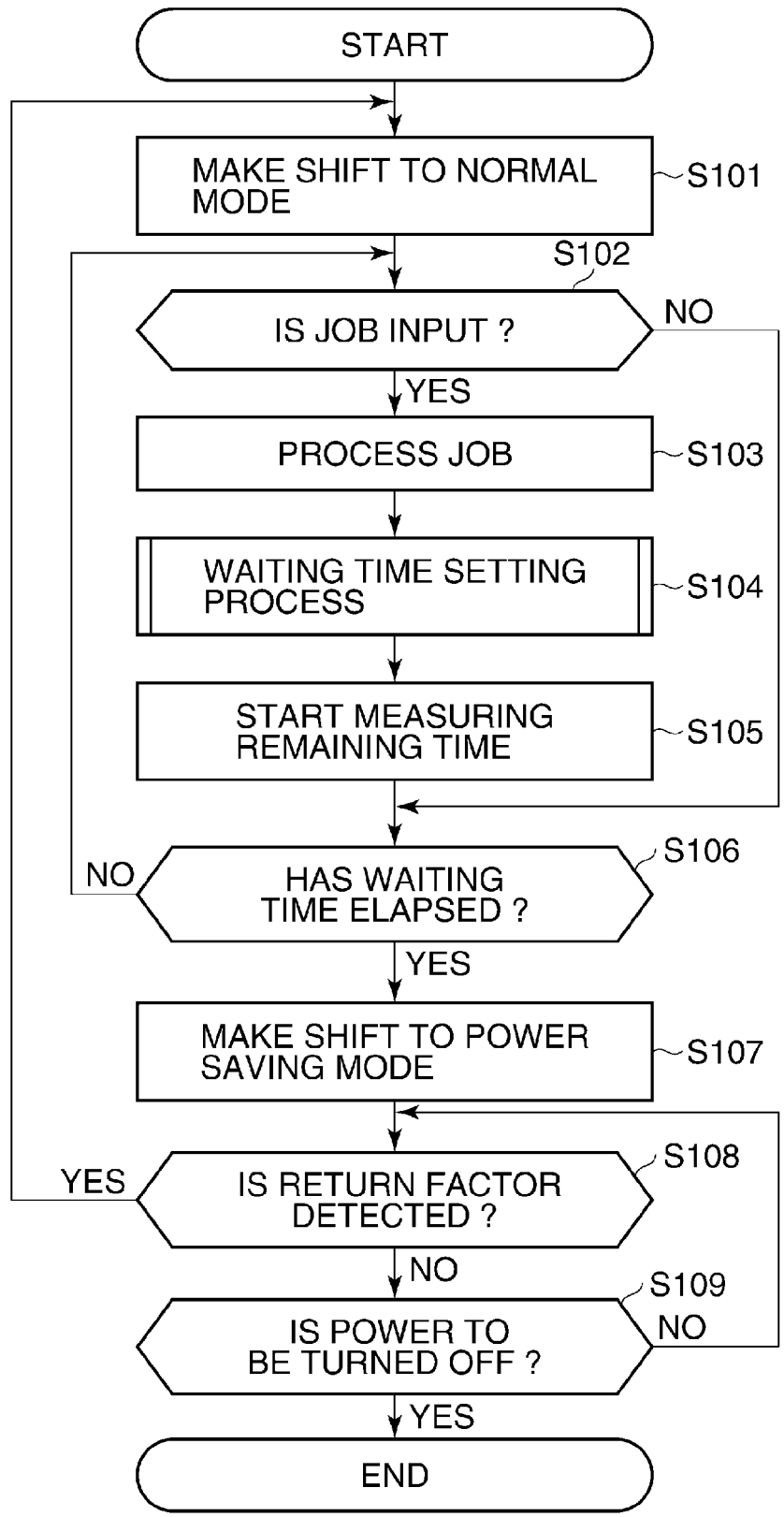
FIG. 2 is a flowchart showing the operation of the multi-function peripheral.

FIG. 2 shows in flowchart the operation of the multi-function peripheral of the first embodiment. This process is performed by the control unit 110 by executing a control program read from, e.g., the HDD 600.

The multi-function peripheral 100 has two power supply modes, i.e., a normal mode and a power saving mode. The normal mode refers to a mode where electric power is supplied from the power unit 200 to all the units of the multi-function peripheral 100, and the power saving mode refers to a mode where electric power is not supplied from the power unit 700 to at least one unit (e.g., the reader unit 200 and/or the printer unit 300) of the multi-function peripheral 100. Power consumption in the power saving mode is therefore lower than that in the normal mode.

In the following description, the term "job" collectively refers to copy job, PDL print job, FAX transmission job, FAX reception job, Send job, BOX storage job, BOX print job, BOX transmission job, BOX reception job, and the like.

The copy job refers to a job where an original is read by the reader unit 200 and read data is printed by the printer unit 300.

The PDL print job refers to a job where image data is input from, e.g., the PC 410 and printed by the printer unit 300. The FAX transmission job refers to a job where an original is read by the reader unit 200 and read data is transmitted to, e.g., the FAX 501. The FAX reception job refers to a job where image data is received from, e.g., the FAX 501 and printed by the printer unit 300.

The Send job refers to a job where an original is read by the reader unit 200 and read data is transmitted by mail to, e.g., the PC 410. The BOX storage job refers to a job where image data read by the reader unit 200 is stored into the HDD 600. The BOX print job is a job where image data stored in the HDD 600 is printed by the printer unit 300. The BOX transmission job refers to a job where image data stored in the HDD 600 is transmitted to, e.g., the PC 410. The BOX reception job refers to a job where image data received from, e.g., the PC 410 is stored into the HDD 600.

The process shown in FIG. 2 is started when the power of the multi-function peripheral 100 is turned on. First, the control unit 110 shifts the multi-function peripheral 100 to the normal mode (S101).

Next, the control unit 110 determines whether a job is input to the multi-function peripheral 100 (S102). If it is determined in S102 that a job is not input, the flow proceeds to S106.

If it is determined in S102 that a job is input, the control unit 110 processes the input job (S103).

Next, the control unit 110 executes a waiting time setting process where a waiting time after which a shift is made from the normal mode to the power saving mode is set to the timer unit 800 (S104). The details of S104 will be described later with reference to FIG. 3.

Next, the control unit 110 causes the timer unit 800 to start measuring a remaining time by subtracting an elapsed time from the waiting time set in S104 (S105).

Next, the control unit 110 determines whether the waiting time has elapsed (i.e., whether the remaining time becomes equal to zero) (S106). If it is determined in S106 that the waiting time has not elapsed, the flow returns to S102.

If it is determined in S106 that the waiting time has elapsed, the control unit 110 shifts the multi-function peripheral 100 to the power saving mode (S107).

Next, the control unit 110 determines whether a return factor according to which the multi-function peripheral 100 returns from the power saving mode to the normal mode is detected (S108). As the return factor, there may be mentioned, for example, input of PDL print job from the PC 410, input of FAX reception job from the FAX 501, input of copy job from the operation unit 500, and start-up of BOX transmission job or BOX print job by the timer unit 800. If it is determined in S108 that the return factor is detected, the flow returns to S101. If it is determined in S108 that the return factor is not detected, the flow proceeds to S109.

In S109, the control unit 110 determines whether or not the power of the multi-function peripheral 100 is to be turned off. If it is determined in S109 that the power of the multi-function peripheral 100 is to be turned off, the process of FIG. 2 is completed. On the other hand, if it is determined in S109 that the power of the multi-function peripheral 100 is not to be turned off, the flow returns to S108.

Figure 3:
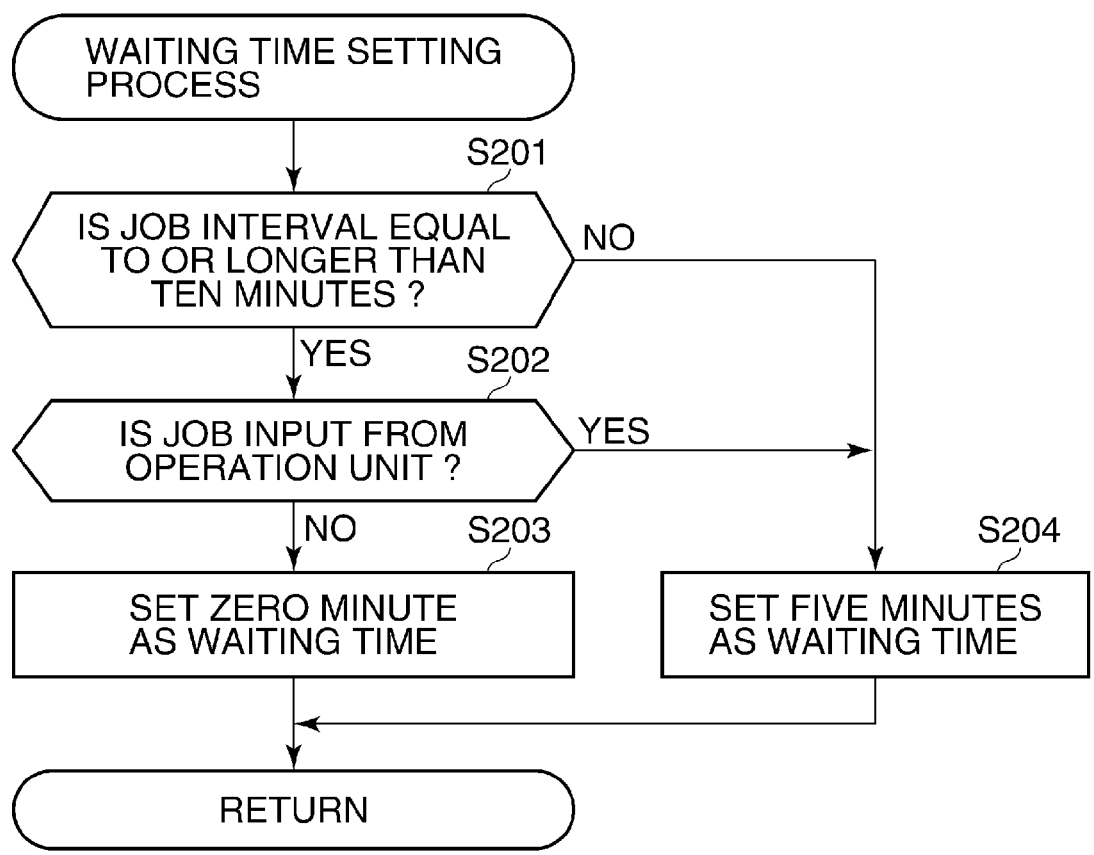
FIG. 3 is a flowchart showing a waiting time setting process in S104 in FIG. 2.

FIG. 3 shows in flowchart the waiting time setting process in S104 in FIG. 2, which is performed by the control unit 110 by executing a control program read from, e.g., the HDD 600.

First, the control unit 110 determines whether a job interval, i.e., a time period from when a preceding job (first job) has been processed to when a current job (second job) is input, is equal to or longer than 10 minutes (first reference time) (S201). It should be noted that the job interval is a time period, measured by the timer unit 800, from when the job has been processed in S103 to when the flow proceeds again to S103 via S106 or S108. Alternatively, the job interval may be a time period from when the preceding job is input to when the current job is input.

If it is determined in S201 that the job interval is equal to or longer than 10 minutes, the control unit 110 determines whether the input job is a job input by operating the operation unit 500 (a job that satisfies a predetermined condition) (S202). As the job input by operating the operation unit 500, there can be mentioned, for example, a copy job, a FAX transmission job, a Send job, a BOX storage job, a BOX print job, and a BOX transmission job.

If it is determined in S202 that the input job is not a job input by operating the operation unit 500, the control unit 110 sets 0 minute (first waiting time) as the waiting time to the timer unit 800 (S203). It should be noted that the first waiting time may be a time period other than 0 minute.

If it is determined in S201 that the job interval is not equal to nor longer than 10 minutes or if it is determined in S202 that the input job is a job input by operating the operation unit 500, the control unit 110 sets 5 minutes (second waiting time) as the waiting time to the timer unit 800 (S204). It should be noted that the second waiting time may be a time period other than 5 minutes so long as it is longer than the first waiting time. The second waiting time may be a time period having the same length as the reference time for the job interval.

In the above explanation, if it is determined in S201 that the job interval is not equal to nor longer than 10 minutes, the flow proceeds to S204 where the second waiting time is set. Alternatively, a third waiting time longer than the first waiting time may be set. The example shown in FIG. 3 is a case where the third waiting time is set to a time period having the same length as the second waiting time.

According to the first embodiment, the waiting time can be set to be long, even if the job interval is long, in a case where an instruction for input of job is given by the user by directly operating the information processing apparatus.

(Second Embodiment)

In the first embodiment, the waiting time is set to 5 minutes in a case where a job is input from the operation unit. On the other hand, in a second embodiment, the waiting time is set to 5 minutes in a case that the job is a job where data is continuously input.

A multi-function peripheral of the second embodiment is the same in construction and operation as the first embodiment (FIGS. 1 and 2), and therefore a description thereof is omitted.

Figure 4:
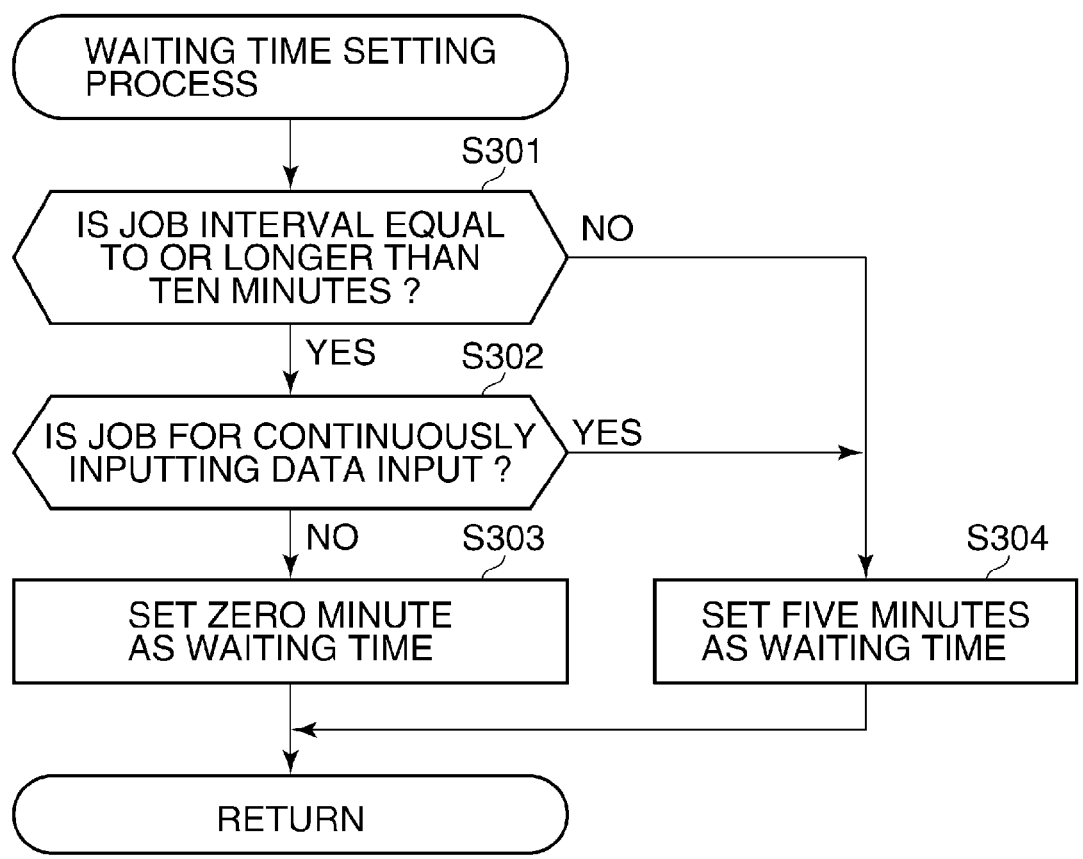
FIG. 4 is a flowchart showing a waiting time setting process performed by a multi-function peripheral according to a second embodiment of this invention.

FIG. 4 shows in flowchart a waiting time setting process of the multi-function peripheral of the second embodiment. This process is performed by the control unit 110 by executing a control program read from, e.g., the HDD 600.

First, the control unit 110 determines whether a job interval is equal to or longer than 10 minutes (first reference time) (S301), as in S201 in FIG. 3.

If it is determined in S301 that the job interval is equal to or longer than 10 minutes, the control unit 110 determines whether the input job is a job for continuously inputting data (i.e., a job that satisfies a predetermined condition) (S302). This determination is made from, e.g., the content of a continuation job, i.e., from, e.g., an environment variable in virtual job description language CJL (common job language) contained in the job. Specifically, if the continuation job is on, it is determined that the input job is a job for continuously inputting data. On the other hand, if the continuation job is off, it is determined that the input job is not a job for continuously inputting data. As the job for continuously inputting data, there can be mentioned a form print job, a form synthesis print job, and a job for printing plural sets of spreadsheet files, which are PDL print jobs.

If it is determined in S302 that the input job is not a job for continuously inputting data, the control unit 110 sets 0 minute (first waiting time) as the waiting time to the timer unit 800 (S303). It should be noted that the first waiting time may be a time period other than 0 minute.

If it is determined in S301 that the job interval is not equal to nor longer than 10 minutes or if it is determined in S302 that the input job is a job for continuously inputting data, the control unit 110 sets 5 minutes (second waiting time) as the waiting time to the timer unit 800 (S304). It should be noted that the second waiting time may be a time period other than 5 minutes so long as it is longer than the first waiting time. The second waiting time may be a time period having the same length as the reference time for the job interval.

In the above explanation, if it is determined in S301 that the job interval is not equal to nor longer than 10 minutes, the flow proceeds to S304 where the second waiting time is set. Alternatively, a third waiting time longer than the first waiting time may be set. The example shown in FIG. 4 is a case where the third waiting time is set to a time period having the same length as the second waiting time.

According to the second embodiment, the waiting time can be set to be long, even if the job interval is long, in a case where the input job is a form print job or other job for continuously inputting data.

(Third Embodiment)

In the first embodiment, the waiting time is set to 5 minutes in a case where a job is input from the operation unit. On the other hand, in a third embodiment, the waiting time is set to 5 minutes in a case that the job interval is equal to or longer than 8 hours.

A multi-function peripheral of the third embodiment is the same in construction and operation as the first embodiment (FIGS. 1 and 2), and therefore, a description thereof is omitted.

Figure 5:
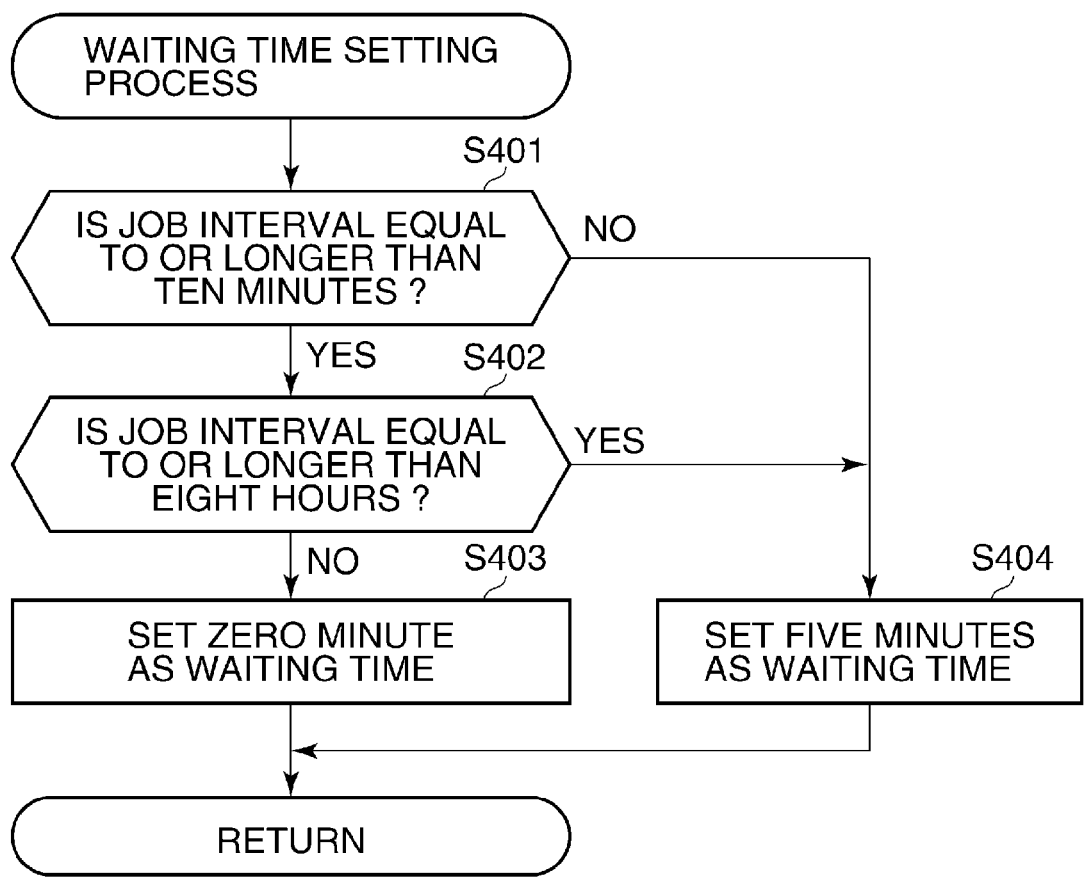
FIG. 5 is a flowchart showing a waiting time setting process performed by a multi-function peripheral according to a third embodiment of this invention.

FIG. 5 shows in flowchart a waiting time setting process of the multi-function peripheral of the third embodiment. This process is performed by the control unit 110 by executing a control program read from, e.g., the HDD 600.

First, the control unit 110 determines whether a job interval is equal to or longer than 10 minutes (first reference time) (S401), as in S201 in FIG. 3.

If it is determined in S401 that the job interval is equal to or longer than 10 minutes, the control unit 110 determines whether the job interval is equal to or longer than 8 hours (second reference time) (i.e., whether the job satisfies a predetermined condition) (S402).

If it is determined in S402 that the job interval is not equal to nor longer than 8 hours, the control unit 110 sets 0 minute (first waiting time) as the waiting time to the timer unit 800 (S403). It should be noted that the first waiting time may be a time period other than 0 minute.

If it is determined in S401 that the job interval is not equal to nor longer than 10 minutes or if it is determined in S402 that the job interval is equal to or longer than 8 hours, the control unit 110 sets 5 minutes (second waiting time) as the waiting time to the timer unit 800 (S404). It should be noted that the second waiting time may be a time period other than 5 minutes so long as it is longer than the first waiting time. The second waiting time may be a time period having the same length as the reference time for the job interval.

In the above explanation, if it is determined in S401 that the job interval is not equal to nor longer than 10 minutes, the flow proceeds to S404 where the second waiting time is set. Alternatively, a third waiting time longer than the first waiting time may be set. The example shown in FIG. 5 is a case where the third waiting time is set to a time period having the same length as the second waiting time.

According to the third embodiment, the waiting time can be set to be long, even if the job interval is long, in a case where no job has been input for a long time period such as at the first thing in the morning or at the first day after long holidays.

The first to third embodiments can be applied singly or in combination to the multi-function peripheral.

(Fourth Embodiment)

In the first embodiment, the waiting time is set to 5 minutes in a case where a job interval is equal to or longer than 10 minutes and a job is input from the operation unit. On the other hand, in a fourth embodiment, the waiting time is set to 0 minute, if it is determined from job learning information that a job is not of a job type which is high in frequency of occurrence, even in a case where the job interval is equal to or longer than 10 minutes and the job is input from the operation unit.

A multi-function peripheral of the fourth embodiment is the same in construction as the first embodiment (previously described referring to FIG. 1), and therefore, a description thereof is omitted.

Figure 6:
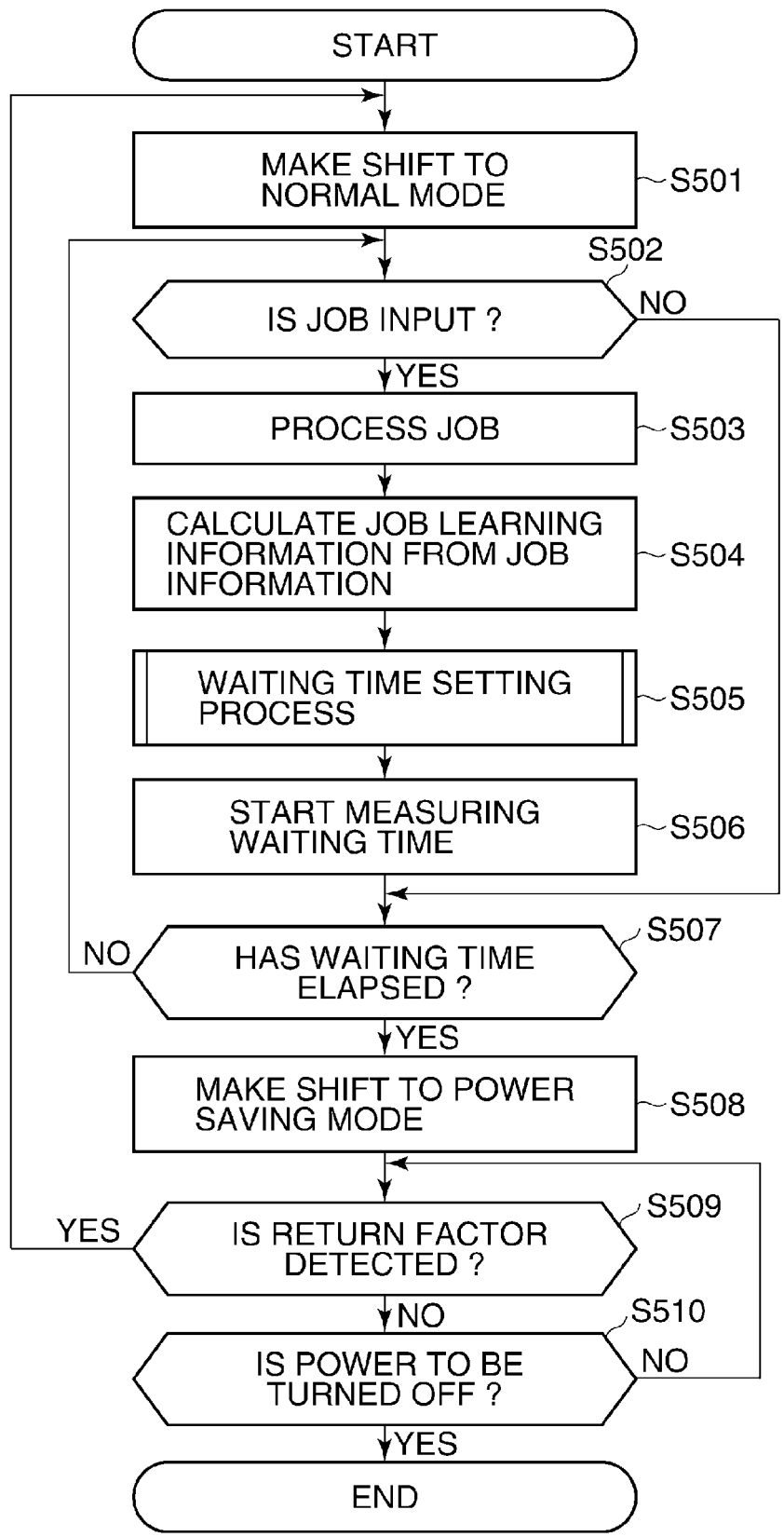
FIG. 6 is a flowchart showing the operation of a multi-function peripheral according to a fourth embodiment of this invention.

FIG. 6 shows in flowchart the operation of the multi-function peripheral of the fourth embodiment. This process is performed by the control unit 110 by executing a control program read from, e.g., the HDD 600.

First, the control unit 110 shifts the multi-function peripheral 100 to the normal mode (S501).

Next, the control unit 110 determines whether a job is input to the multi-function peripheral 100 (S502). If it is determined in S502 that a job is input, the flow proceeds to S503. If it is determined in S502 that a job is not input, the flow proceeds to S507.

If it is determined in S502 that a job is input, the control unit 110 processes the input job (S503).

Next, the control unit 110 calculates job learning information such as job frequency and job average execution time from job information such as job type, job start time, job end time, and job execution time, and in the case of job being received via the network, transmission source IP (S504).

The job type represents each or all of copy job, PDL print job, FAX transmission job, FAX reception job, Send job, BOX storage job, BOX print job, BOX transmission job, BOX reception job, etc. The job start time, the job end time, and the job execution time represent a time at which the job is started, a time at which the job is completed, and a time period for which the job is executed, respectively.

The job frequency represents a total number of occurrence times of jobs per given time period (e.g., one hour) or an average value obtained by dividing total numbers of occurrence times of jobs in plural cycles (i.e., in at least two preceding cycles or in at least one preceding cycle and the current cycle) by the number of cycles. The job average execution time represents an average execution time period per given time period (e.g., one hour) and per each job type.

Next, the control unit 110 executes a waiting time setting process where a waiting time after which a shift is made from the normal mode to the power saving mode is set to the timer unit 800 (S505). The details of S505 will be described later with reference to FIG. 7.

Next, the control unit 110 controls the timer unit 800 to start measuring the waiting time set in S505 (i.e., to start subtracting time from the set waiting time) (S506).

Next, the control unit 110 determines whether the waiting time whose measurement has been started in S506 has elapsed (i.e., whether the remaining time obtained by subtracting time from the set waiting time becomes equal to zero) (S507). If it is determined in S507 that the waiting time has elapsed, the flow proceeds to S508. If it is determined in S507 that the waiting time has not elapsed, the flow proceeds to S502.

If it is determined in S507 that the waiting time has elapsed, the control unit 110 shifts the multi-function peripheral 100 to the power saving mode (S508).

Next, the control unit 110 determines whether a return factor according to which the power saving mode is returned to the normal mode is detected (S509). As the return factor, there may be mentioned, for example, input of PDL print job from the PC 410, input of FAX reception job from the FAX 501, input of copy job via the operation unit 500, and start-up of BOX transmission job or BOX print job by the timer unit 800. If it is determined in S509 that a return factor is detected, the flow proceeds to S501. If it is determined in S509 that a return factor is not detected, the flow proceeds to S510.

If it is determined in S509 that a return factor is not detected, the control unit 110 determines whether or not the power supply to the multi-function peripheral 100 is to be turned off (S510). If it is determined in S510 that the power supply to the multi-function peripheral 100 is to be turned off, the process is completed. If it is determined in S510 that the power supply to the multi-function peripheral 100 is not to be turned off, the flow proceeds to S509.

Figure 7:
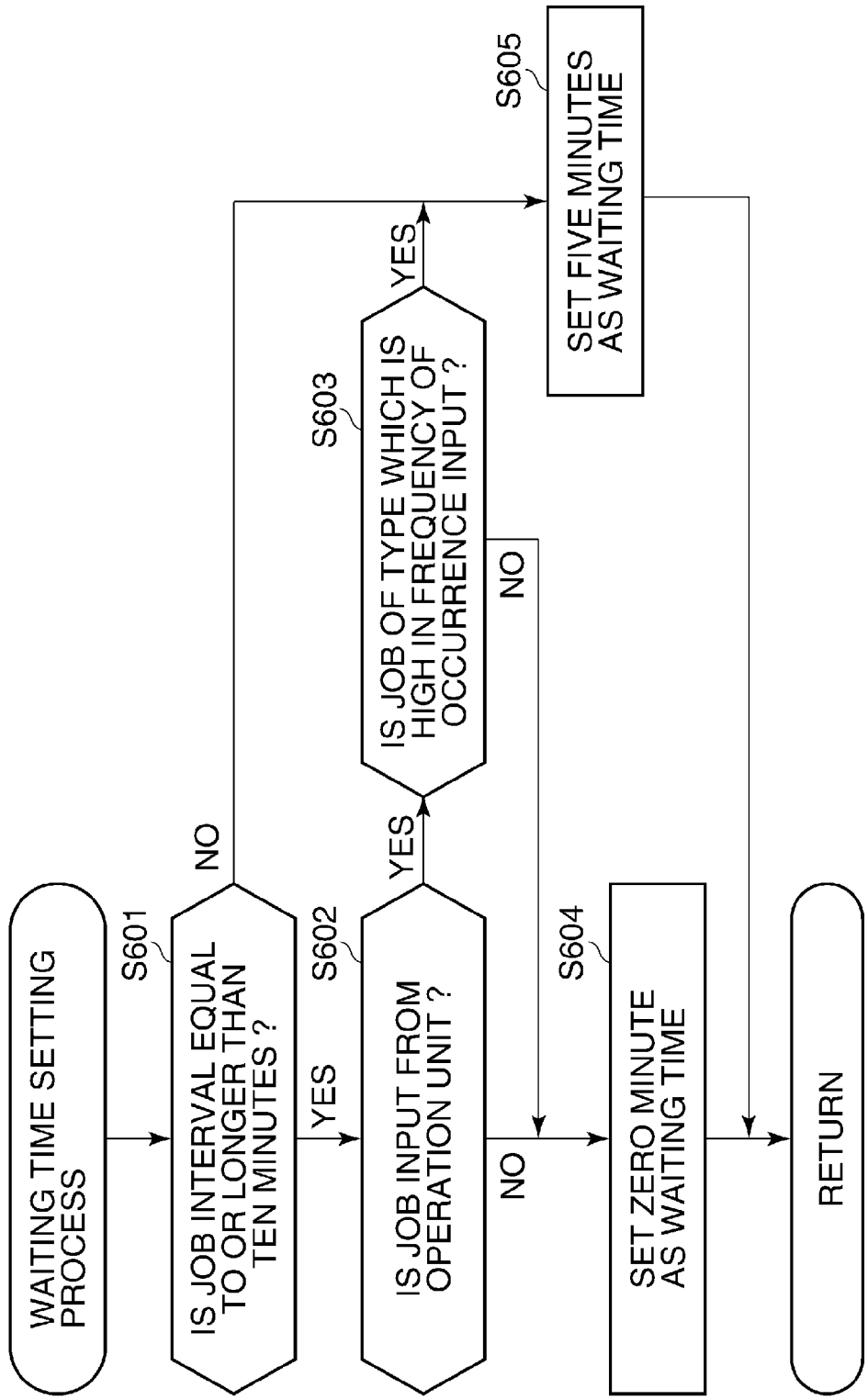
FIG. 7 is a flowchart showing a waiting time setting process in the multi-function peripheral according to the fourth embodiment.

FIG. 7 shows in flowchart a waiting time setting process in the multi-function peripheral of the fourth embodiment. This process is performed by the control unit 110 by executing a control program read from, e.g., the HDD 600.

First, the control unit 110 determines whether a job interval, i.e., a time period from when a preceding job (first job) has been processed to when a current job (second job) is input, is equal to or longer than 10 minutes (first reference time) (S601). It should be noted that the job interval can be found by measuring by the timer unit 800 a time period from when the job has been processed in S503 to when the flow proceeds again to S503 via S507 or S509. Alternatively, the job interval may be a time period from when the preceding job is input to when the current job is input. If it is determined in S601 that the job interval is equal to or longer than 10 minutes, the flow proceeds to S602. If it is determined in S601 that the job interval is not equal to nor longer than 10 minutes, the flow proceeds to S605.

If it is determined in S601 that the job interval is equal to or longer than 10 minutes, the control unit 110 determines whether the input job is a job input by operating the operation unit 500 (i.e., a job that satisfies a predetermined condition) (S602). As the job input by operating the operation unit 500, there may be mentioned, for example, copy job, FAX transmission job, Send job, BOX storage job, BOX print job, and BOX transmission job.

If it is determined in S602 that the input job is a job input by operating the operation unit 500, the flow proceeds to S603. On the other hand, if it is determined in S602 that the input job is not a job input by operating the operation unit 500, the flow proceeds to S604.

If it is determined in S603 that the input job is of a job type which is high in frequency of occurrence to an extent that the number of occurrence times of jobs per given time period or its average value is greater than a predetermined number or value (e.g., the input job is a copy job and the average value per one hour is five), the flow proceeds to S605. On the other hand, if it is determined in S603 that the input job is not of a job type which is high in frequency of occurrence, the flow proceeds to S604.

In S604, the control unit 110 sets 0 minute (first waiting time) as the waiting time to the timer unit 800. It should be noted that the first waiting time may be a time period other than 0 minute.

In S605, the control unit 110 sets 5 minutes (second waiting time) as the waiting time to the timer unit 800. It should be noted that the second waiting time may be a time period other than 5 minutes so long as it is longer than the first waiting time. The second waiting time may be a time period having the same length as the reference time for the job interval.

In the above explanation, if it is determined in S601 that the job interval is not equal to nor longer than 10 minutes, the flow proceeds to S605 to set the second waiting time. Alternatively, a third waiting time longer than the first waiting time may be set. In that case, the third waiting time may have the same length as the second waiting time.

According to the fourth embodiment, the waiting time can be set to be short if the job is not of a job type which is high in frequency of occurrence.

(Fifth Embodiment)

In a fifth embodiment, the waiting time is set to 5 minutes in a case where the job is a print job input via the network and the job average execution time is longer than a predetermined time period (e.g., 30 minutes), even if the job interval is equal to or longer than 10 minutes.

A multi-function peripheral of the fifth embodiment is the same in construction as the first embodiment (previously described referring to FIG. 1), and therefore, a description thereof is omitted.

The multi-function peripheral of the fifth embodiment is the same in operation as the fourth embodiment (previously described referring to FIG. 6), and therefore, a description thereof is omitted.

Figure 8:
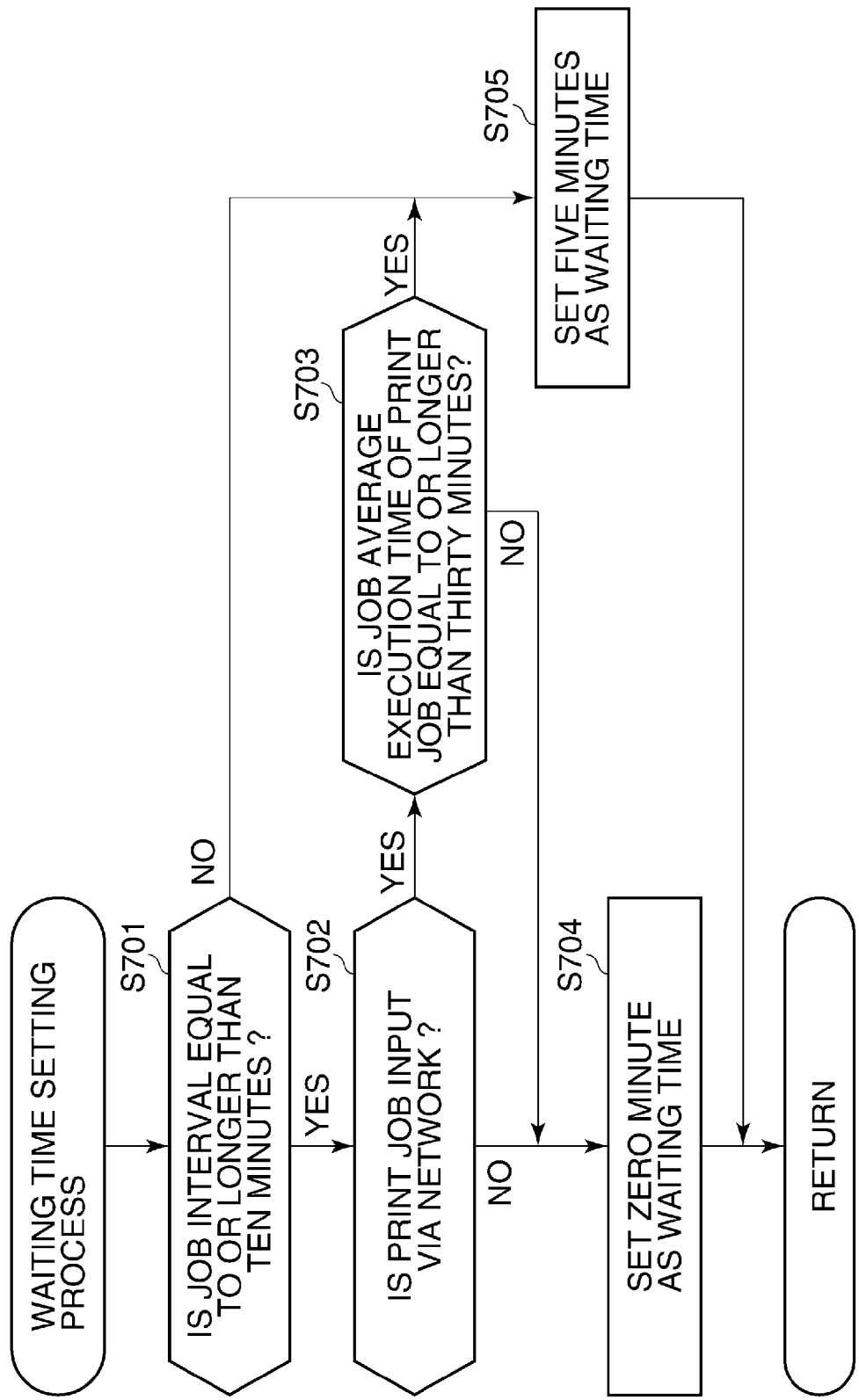
FIG. 8 is a flowchart showing a waiting time setting process in a multi-function peripheral according to a fifth embodiment of this invention.

FIG. 8 shows in flowchart a waiting time setting process in the multi-function peripheral of the fifth embodiment. This process is performed by the control unit 110 by executing a control program read from, e.g., the HDD 600.

First, the control unit 110 determines whether a job interval, i.e., a time period from when a preceding job (first job) has been processed to when a current job (second job) is input, is equal to or longer than 10 minutes (first reference time) (S701). It should be noted that the job interval can be found by the timer unit 800 by measuring a time period from when the job has been processed in S503 to when the flow proceeds again to S503 via S507 or S509. The job interval may be a time period from when the preceding job is input to when the current job is input. If it is determined in S701 that the job interval is equal to or longer than 10 minutes, the flow proceeds to S702. If it is determined in S701 that the job interval is not equal to nor longer than 10 minutes, the flow proceeds to S705.

In S702, the control unit 110 determines whether the input job is a print job input via the network, in which the printer unit 300 is used, such as a PDL print job or a FAX transmission job for printing a FAX transmission result report. If the input job is a print job input via the network, the flow proceeds to S703. On the other hand, if the input job is not a print job input via the network, the flow proceeds to S704.

In S703, the control unit 110 determines whether the job average execution time of the print job input via the network is equal to or longer than a predetermined time period (e.g., 30 minutes). If the job average execution time is less than 30 minutes, the flow proceeds to S704. If the job average execution time is equal to or longer than 30 minutes, the flow proceeds to S705.

In S704, the control unit 110 sets 0 minute (first waiting time) as the waiting time to the timer unit 800. It should be noted that the first waiting time may be a time period other than 0 minute.

In S705, the control unit 110 sets 5 minutes (second waiting time) as the waiting time to the timer unit 800. It should be noted that the second waiting time may be a time period other than 5 minutes as long as it is longer than the first waiting time. The second waiting time may be a time period having the same length as the reference time for the job interval.

In the above explanation, if it is determined in S701 that the job interval is not equal to nor longer than 10 minutes, the flow proceeds to S705 to set the second waiting time. Alternatively, a third waiting time longer than the first waiting time may be set. In that case, the third waiting time may have the same length as the second waiting time.

According to the fifth embodiment, it is possible to set the waiting time to be long in the case of a job whose job average execution time is long such as the printing of a large number of pages. As a result, the waiting time can be set to be long in the multi-function peripheral capable of printing at high speed and used for execution of a long-running job although it takes much time to restart the printer unit 300 from the power-saving state, whereby a time period required for completion of subsequent printing can be shortened even in the power-saving setting.

(Sixth Embodiment)

In a sixth embodiment, even if the job interval is not equal to nor longer than 10 minutes, the waiting time is set to 0 minute in a case where a multi-function peripheral is set not to use the printer.

The multi-function peripheral of the sixth embodiment is the same in construction as the first embodiment (previously described referring to FIG. 1), and therefore, a description thereof is omitted.

The multi-function peripheral of the sixth embodiment is the same in operation as the fourth embodiment (previously described referring to FIG. 6), and therefore, a description thereof is omitted.

Figure 9:
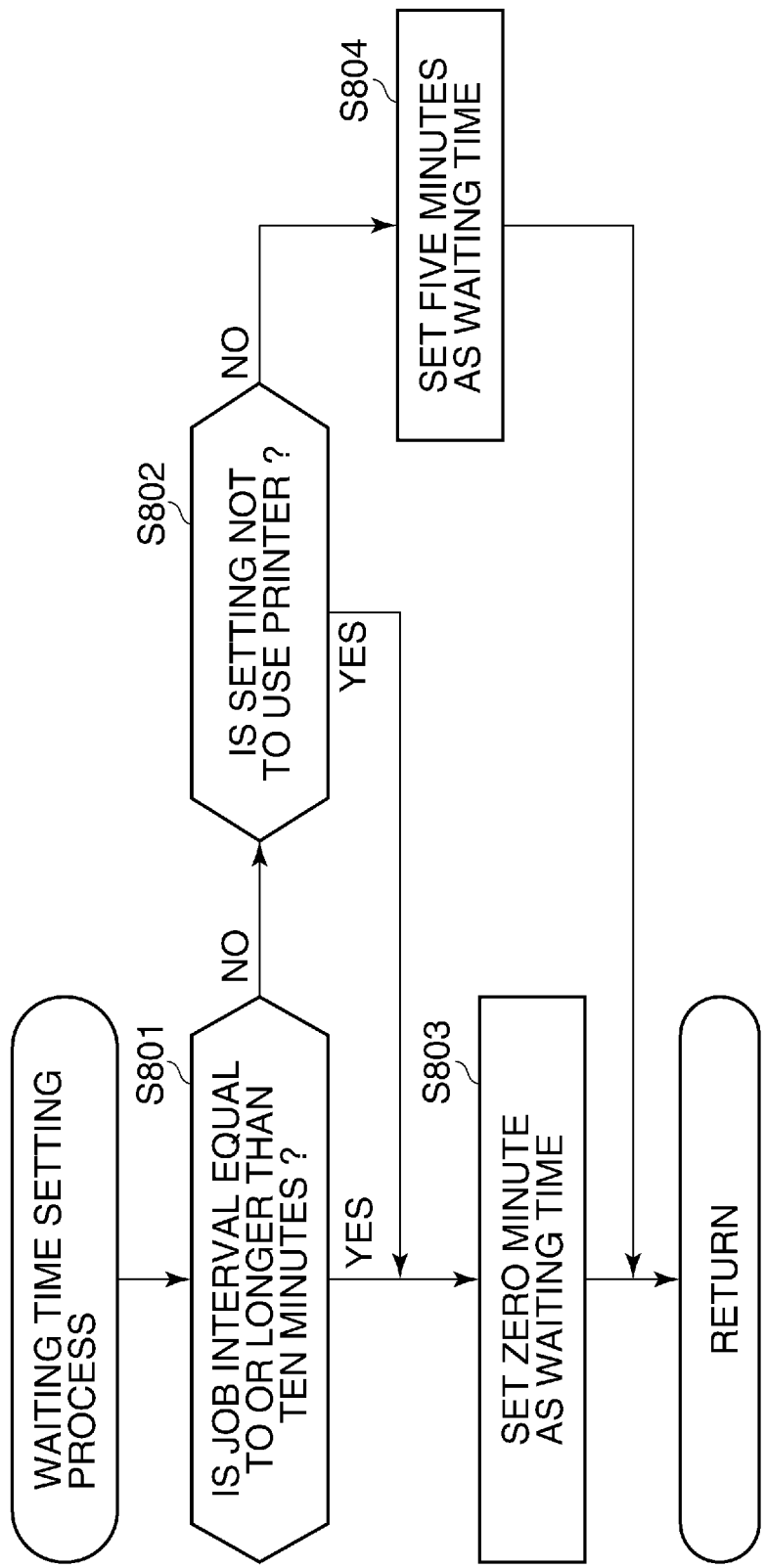
FIG. 9 is a flowchart showing a waiting time setting process in a multi-function peripheral according to a sixth embodiment of this invention.

FIG. 9 shows in flowchart a waiting time setting process in the multi-function peripheral of the sixth embodiment. This process is performed by the control unit 110 by executing a control program read from, e.g., the HDD 600.

First, the control unit 110 determines whether a job interval, i.e., a time period from when a preceding job (first job) has been processed to when a current job (second job) is input, is equal to or longer than 10 minutes (first reference time) (S801). The job interval can be found by the timer unit 800 by measuring a time period from when the job has been processed in S503 to when the flow proceeds again to S503 via S507 or S509. The job interval may be a time period from when the preceding job is input to when the current job is input. If it is determined in S801 that the job interval is equal to or longer than 10 minutes, the flow proceeds to S803. If it is determined in S801 that the job interval is not equal to nor longer than 10 minutes, the flow proceeds to S802.

In S802, the control unit 110 confirms a setting state to determine whether the setting of a job to be executed is not to use the printer unit 300. The setting state refers to, e.g., a setting indicating whether a degeneracy operation should be made when the printer unit 300 is in a faulty or error state, a setting indicating whether received data of FAX reception job should not be printed by the printer unit 300 but stored into a memory or the HDD 600, and a setting indicating whether a transmission result report should not be printed but stored into a memory or the HDD 600 in the execution of FAX transmission job, Send job, or BOX transmission job. If the setting of a job to be executed is not to use the printer, the flow proceeds to S803. On the other hand, if the setting of a job to be executed is not "not to use the printer," the flow proceeds to S804.

In S803, the control unit 110 sets 0 minute (first waiting time) as the waiting time to the timer unit 800. The first waiting time may be a time period other than 0 minute.

In S804, the control unit 110 sets 5 minutes (second waiting time) as the waiting time to the timer unit 800. The second waiting time may be a time period other than 5 minutes as long as it is longer than the first waiting time. The second waiting time may be a time period having the same length as the reference time for the job interval.

Although the second waiting time is set in S804, a third waiting time longer than the first waiting time may be set instead. In that case, the third waiting time may be a time period having the same length as the second waiting time.

According to the sixth embodiment, the waiting time can be set to be short in the case of a job that does not use the printer unit 300 since the job can be executed without the need of waiting for temperature rise of the printer unit 300 at the time of restoration from the power saving mode.

(Seventh Embodiment)

In a seventh embodiment, the waiting time is set to 0 minute in a case where a frequently used host is not in operation and hosts which are less in number than a predetermined number are in operation, even if the job interval is not equal to nor longer than 10 minutes.

A multi-function peripheral of the seventh embodiment is the same in construction as the first embodiment (previously described referring to FIG. 1), and therefore, a description thereof is omitted.

The multi-function peripheral of the seventh embodiment is the same in operation as the fourth embodiment (previously described referring to FIG. 6), and therefore, a description thereof is omitted.

Figure 10:
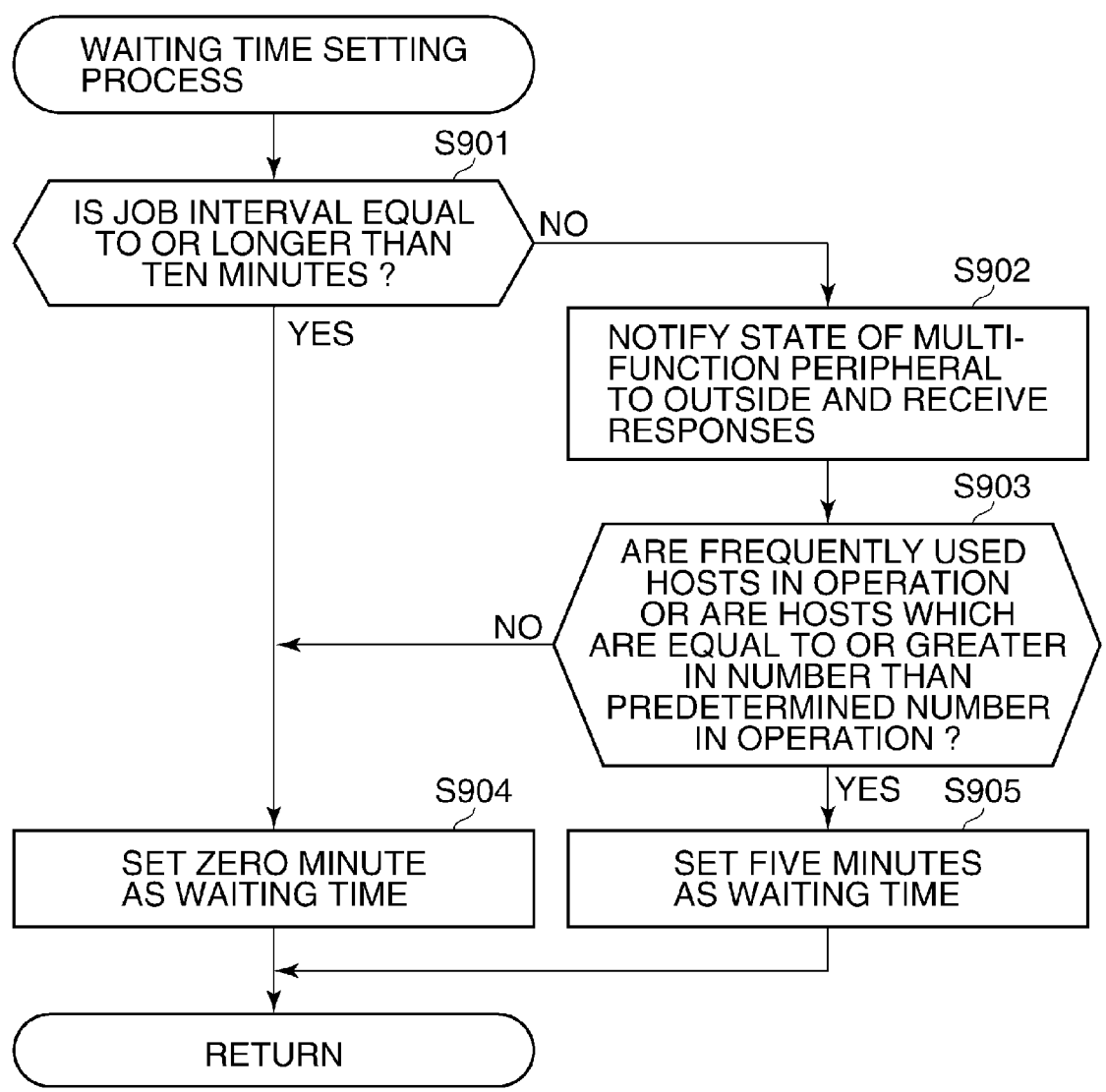
FIG. 10 is a flowchart showing a waiting time setting process in a multi-function peripheral according to a seventh embodiment of this invention.

FIG. 10 shows in flowchart a waiting time setting process in the multi-function peripheral of the seventh embodiment. This process is performed by the control unit 110 by executing a control program read from, e.g., the HDD 600.

First, the control unit 110 determines whether a job interval, i.e., a time period from when a preceding job (first job) has been processed to when a current job (second job) is input, is equal to or longer than 10 minutes (first reference time) (S901). It should be noted that the job interval can be found by the timer unit 800 by measuring a time period from when the job has been processed in S503 to when the flow proceeds again to S503 via S507 or S509. The job interval may be a time period from when a preceding job is input to when a current job is input. If it is determined in S901 that the job interval is equal to or longer than 10 minutes, the flow proceeds to S904. If it is determined in S901 that the job interval is not equal to nor longer than 10 minutes, the flow proceeds to S902.

In S902, the control unit 110 notifies a state of the multi-function peripheral (e.g., the fact that a shift to the power saving mode can be made) to the outside of the multi-function peripheral, and receives responses to the notification, whereupon the flow proceeds to S903.

If it is determined in S903 from the received responses and the job learning information that hosts each of which frequently receives a job are not in operation and hosts each able to transmit a job, which are less in number than a predetermined number (e.g., ten), are in operation, there is a low possibility that the next job will be received, and therefore the flow proceeds to S904. On the other hand, if it is determined in S903 that hosts each of which frequently receives a job are in operation or that hosts each able to transmit a job, which are equal to or greater in number than the predetermined number, are in operation, there is a high possibility that the next job will be received, and therefore the flow proceeds to S905. The number of hosts each of which frequently receives a job may not be one but may be equal to or greater than zero or more.

In S904, the control unit 110 sets 0 minute (first waiting time) as the waiting time to the timer unit 800. It should be noted that the first waiting time may be a time period other than 0 minute.

In S905, the control unit 110 sets 5 minutes (second waiting time) as the waiting time to the timer unit 800. The second waiting time may be a time period other than 5 minutes as long as it is longer than the first waiting time. The second waiting time may be a time period having the same length as the reference time for the job interval.

Although the second waiting time is set in S905, a third waiting time longer than the first waiting time can be set instead. In that case, the third waiting time may be a time period having the same length as the second waiting time.

According to the seventh embodiment, the waiting time can be set to be short, even if the job interval is short, in a case where a frequently used host is not in operation and hosts which are not equal to nor greater in number than a predetermined number are in operation since it can be determined in that case that the power supply to the information processing apparatus will soon be turned off.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-162690, filed Jul. 9, 2009, which is hereby incorporated by reference herein in its entirety.

What is claimed is:

1. An information processing apparatus operable in a power saving mode, the information processing apparatus comprising:
   a determination unit configured to determine whether a job interval between a first job and a second job to be processed subsequently to the first job is longer than a reference time; and
   a control unit configured to shift the information processing apparatus to the power saving mode:
      when a first waiting time has elapsed after the second job has been processed in a case where the second job is a first type job,
      when a second waiting time, which is shorter than the first waiting time, elapses after the second job has been processed in a case where the determination unit determines that the job interval is longer than the reference time and the second job is a second type job that is different from the first type job, and
      when the first waiting time elapses in a case where the determination unit determines that the job interval is not longer than the reference time and the second job is the second type job.

2. The information processing apparatus according to claim 1, wherein the control unit shifts the information processing apparatus to the power saving mode promptly after the second job has been processed in a case where the determination unit determines that the job interval is longer than the reference time and the second job is the second type job.

3. The information processing apparatus according to claim 1, wherein the first type job is a job input via an operation unit and the second type job is not a job input via the operation unit.

4. The information processing apparatus according to claim 1, further including a printer unit configured to form an image on a sheet.

5. The information processing apparatus according to claim 4, wherein the control unit is configured to shift the information processing apparatus from a normal mode, in which power is supplied to the printer unit, to the power saving mode:
   when the first waiting time has elapsed after the second job has been processed by the printer unit in a case where the second job is the first type job,
   when the second waiting time elapses after the second job has been processed by the printer unit in a case where the determination unit determines that the job interval is longer than the reference time and the second job is the second type job, and
   when the first waiting time elapses in a case where the determination unit determines that the job interval is not longer than the reference time and the second job is the second type job.

6. The information processing apparatus according to claim 3, wherein the job input by the operation unit is any one of a copy job, a FAX transmission job, a Send job, a BOX storage job, a BOX print job, or a BOX transmission job.

7. The information processing apparatus according to claim 4, further including:
   a judgment unit configured to judge whether the first or second job is a job for continuously inputting data,
   wherein the control unit is configured to shift the information processing apparatus from a normal mode, in which power is supplied to the printer unit, to the power saving mode when the first waiting time has elapsed after the second job has been processed by the printer unit in a case where the judgment unit determined that the first or second job is the job for continuously inputting data.

8. The information processing apparatus according to claim 7, wherein the job for continuously inputting data is any one of a form print job, a form synthesis print job, or a job for printing plural sets of spreadsheet files.

9. The information processing apparatus according to claim 1, further including:
   a printer unit configured to form an image on a sheet,
   wherein the power is not supplied to the printer unit in the power saving mode.

10. The information processing apparatus according to claim 9, further including:
    a detection unit configured to detect a predetermined return factor, wherein the control unit is configured to shift the information processing apparatus from the power saving mode to a normal mode, in which power is supplied to the printer unit, in a case where the information processing apparatus operates in the power saving mode and the predetermined return factor is detected by the detection unit.

11. The information processing apparatus according to claim 10, wherein the predetermined return factor is a job being input.

12. The information processing apparatus according to claim 9, further including:
   a supply unit configured to supply electric power,
   wherein the supply unit supplies electric power to the printer unit in a normal mode.

13. A control method for an information processing apparatus operable in a power saving mode, the control method comprising:
   a determination step of determining whether a job interval between a first job and a second job to be processed subsequently to the first job is longer than a reference time; and
   a control step of shifting the information processing apparatus to the power saving mode:
      when a first waiting time has elapsed after the second job has been processed in a case where the second job is a first type job,
      when a second waiting time, which is shorter than the first waiting time, elapses after the second job has been processed in a case where the determination step determines that the job interval is longer than the reference time and the second job is a second type job that is different from the first type job, and
      when the first waiting time elapses in a case where the determination step determines that the job interval is not longer than the reference time and the second job is the second type job.

14. A non-transitory computer-readable storage medium storing a program executable by a computer to execute the control method for an information processing apparatus operable in a power saving mode, the control method comprising:
   a determination step of determining whether a job interval between a first job and a second job to be processed subsequently to the first job is longer than a reference time; and
   a control step of shifting the information processing apparatus to the power saving mode:
      when a first waiting time has elapsed after the second job has been processed in a case where the second job is a first type job,
      when a second waiting time, which is shorter than the first waiting time, elapses after the second job has been processed in a case where the determination step determines that the job interval is longer than the reference time and the second job is a second type job that is different from the first type job, and
      when the first waiting time elapses in a case where the determination step determines that the job interval is not longer than the reference time and the second job is the second type job.

15. The information processing apparatus according to claim 1, wherein the job interval is a time period from when the first job has been processed to when the second job is input.

16. The information processing apparatus according to claim 1, further comprising:
   a power-off determination unit configured to determine whether or not power of the information processing apparatus is to be turned off,
   wherein the control unit turns off the power of the information processing apparatus when the power-off determining unit determines that the power of the information processing apparatus is to be turned off.

17. An information processing apparatus operable in a power saving mode, the information processing apparatus comprising:
   a determination unit configured to determine whether a job interval between a first job and a second job to be processed subsequently to the first job is longer than a reference time;
   a control unit configured to shift the information processing apparatus to the power saving mode when a waiting time has elapsed; and
   a setting unit configured to set:
      a first waiting time as the waiting time in a case where the second job is a first type job,
      a second waiting time different from the first waiting time as the waiting time in a case where the determination unit determines that the job interval is longer than the reference time and the second job is a second type job that is different from the first type job, and
      the first waiting time as the waiting time in a case where the determination unit determines that the job interval is not longer than the reference time and the second job is the second type job.

18. The information processing apparatus according to claim 17, wherein the second waiting time is shorter than the first waiting time.

19. The information processing apparatus according to claim 18, wherein the second waiting time is 0 minute.

20. The information processing apparatus according to claim 17, further including a printer unit configured to form an image on a sheet or a scanner unit configured to read an original.

21. The information processing apparatus according to claim 20, wherein the control unit is configured to shift the information processing apparatus from a normal mode, in which power is supplied to the control unit, to the power saving mode when the waiting time has elapsed.

22. The information processing apparatus according to claim 17, wherein the second type job is a job input via a operation unit and the first type job is not a job input via the operation unit.

23. The information processing apparatus according to claim 22, wherein the job input by the operation unit is any one of a copy job, a FAX transmission job, a Send job, a BOX storage job, a BOX print job, or a BOX transmission job.

24. The information processing apparatus according to claim 17, wherein the first type job is a job input via a network.

25. The information processing apparatus according to claim 1, wherein the first job comprises the last job having processed before the information processing apparatus is shifted to the power saving mode, and the second job comprises a primary job to be processed after the information processing apparatus has been returned from the power saving mode to the normal mode.

* * * * *